United States Patent
Zhu et al.

(10) Patent No.: US 9,167,482 B2
(45) Date of Patent: Oct. 20, 2015

(54) METHOD AND SYSTEM FOR REALIZING NETWORK SWITCHING

(75) Inventors: Chunhui Zhu, Shenzhen (CN); Zaifeng Zong, Shenzhen (CN); Xiaoyun Zhou, Shenzhen (CN); Jinguo Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 570 days.

(21) Appl. No.: 12/999,747

(22) PCT Filed: Dec. 9, 2008

(86) PCT No.: PCT/CN2008/073405
§ 371 (c)(1),
(2), (4) Date: Dec. 17, 2010

(87) PCT Pub. No.: WO2009/152669
PCT Pub. Date: Dec. 23, 2009

(65) Prior Publication Data
US 2011/0103340 A1    May 5, 2011

(30) Foreign Application Priority Data
Jun. 20, 2008    (CN) .......................... 2008 1 0124969

(51) Int. Cl.
*H04W 4/00* (2009.01)
*H04W 36/00* (2009.01)
(Continued)

(52) U.S. Cl.
CPC .......... *H04W 36/0011* (2013.01); *H04W 36/14* (2013.01); *H04W 80/04* (2013.01); *H04W 88/06* (2013.01)

(58) Field of Classification Search
USPC ................. 370/235, 328, 329, 331, 338, 401; 455/433, 436; 709/221
See application file for complete search history.

(56) References Cited

U.S. PATENT DOCUMENTS 7,539,164 B2 * 5/2009 Maenpaa et al. .............. 370/331
8,228,843 B2 * 7/2012 Sarikaya ....................... 370/328
(Continued)

FOREIGN PATENT DOCUMENTS

| CN | 200610113174.4 A | 3/2008 |
|----|------------------|--------|
| CN | 101175316 A | 5/2008 |
| WO | 2008046655 A1 | 4/2008 |

OTHER PUBLICATIONS

V. Devarapalli et al. Multiple Interface Support with Proxy Mobile IPv6, Nov. 12, 2007.*
(Continued)

*Primary Examiner* — Chirag Shah
*Assistant Examiner* — Jael Ulysse
(74) *Attorney, Agent, or Firm* — McGarry Bair PC

(57) ABSTRACT

A method and system for realizing network switching, and a mobile node are provided. An LMA receives a PBU message from a second MAG, wherein the PBU message carries identifier information of the mobile node, the IP address of a first interface, and the IP address of the second MAG. The LMA checks in the stored BCE whether the identifier information of the mobile node and the IP address of the first interface exist. If the existence is checked, the LMA continually judges whether the Proxy Care-of-Address in the BCE is the same as the Proxy Care-of-Address in the PBU message. If they are different, the LMA determines that the connection of the mobile node is a switchable connection, and determines that the mobile node has the ability of address preservation, then sends the IP address of the first interface to the second MAG.

11 Claims, 8 Drawing Sheets

(51) Int. Cl.
*H04W 36/14* (2009.01)
*H04W 80/04* (2009.01)
*H04W 88/06* (2009.01)

(56) References Cited

U.S. PATENT DOCUMENTS

| | | | | |
|---|---|---|---|---|
| 2004/0013116 | A1* | 1/2004 | Greis et al. | 370/392 |
| 2004/0176095 | A1* | 9/2004 | Yamada et al. | 455/445 |
| 2004/0264476 | A1* | 12/2004 | Alarcon et al. | 370/395.52 |
| 2006/0198345 | A1* | 9/2006 | Chen | 370/338 |
| 2007/0189255 | A1* | 8/2007 | Navali et al. | 370/338 |
| 2007/0258424 | A1* | 11/2007 | Wable et al. | 370/338 |
| 2007/0268919 | A1* | 11/2007 | Sarikaya et al. | 370/401 |
| 2007/0297377 | A1* | 12/2007 | McCann et al. | 370/338 |
| 2008/0130571 | A1* | 6/2008 | Maeda et al. | 370/331 |
| 2008/0181113 | A1* | 7/2008 | Narayanan et al. | 370/235 |
| 2008/0198807 | A1* | 8/2008 | Xia et al. | 370/331 |
| 2008/0207206 | A1* | 8/2008 | Taniuchi et al. | 455/436 |
| 2008/0285518 | A1* | 11/2008 | Dutta et al. | 370/331 |
| 2008/0301434 | A1* | 12/2008 | Haddad et al. | 713/153 |
| 2008/0310323 | A1* | 12/2008 | Shirota et al. | 370/254 |
| 2008/0316974 | A1* | 12/2008 | Krishnan et al. | 370/331 |
| 2009/0003297 | A1* | 1/2009 | Xia et al. | 370/338 |
| 2009/0016270 | A1* | 1/2009 | Tsirtsis (Georgios) et al. | 370/328 |
| 2009/0016300 | A1* | 1/2009 | Ahmavaara et al. | 370/331 |
| 2009/0016364 | A1* | 1/2009 | Krishnan | 370/401 |
| 2009/0022126 | A1* | 1/2009 | Damle et al. | 370/338 |
| 2009/0040964 | A1* | 2/2009 | Zhao et al. | 370/328 |
| 2009/0073935 | A1* | 3/2009 | Xia et al. | 370/331 |
| 2009/0080441 | A1* | 3/2009 | Krishnan et al. | 370/400 |
| 2009/0122750 | A1* | 5/2009 | Sarikaya | 370/328 |
| 2009/0135783 | A1* | 5/2009 | Khalil et al. | 370/331 |
| 2009/0163203 | A1* | 6/2009 | Stojanovski et al. | 455/432.3 |
| 2009/0207808 | A1* | 8/2009 | Mccann et al. | 370/331 |
| 2009/0207812 | A1* | 8/2009 | Gupta et al. | 370/332 |
| 2009/0245149 | A1* | 10/2009 | Xia et al. | 370/310 |
| 2009/0290540 | A1* | 11/2009 | Cherian et al. | 370/328 |
| 2010/0067446 | A1* | 3/2010 | Oulai et al. | 370/329 |
| 2010/0103876 | A1* | 4/2010 | Aso | 370/328 |
| 2010/0254347 | A1* | 10/2010 | Muhanna et al. | 370/331 |
| 2010/0272061 | A1* | 10/2010 | Muhanna et al. | 370/331 |
| 2010/0290621 | A1* | 11/2010 | Muhanna et al. | 380/270 |
| 2011/0007711 | A1* | 1/2011 | Muhanna et al. | 370/331 |
| 2011/0153792 | A1* | 6/2011 | Bachmann et al. | 709/221 |
| 2011/0191494 | A1* | 8/2011 | Turanyi et al. | 709/242 |
| 2012/0238266 | A1* | 9/2012 | Bachmann et al. | 455/433 |

OTHER PUBLICATIONS

Gundavelli et al. Proxy Mobile IPv6 draft-ietf-netlmm-proxymip6-16.txt, May 21, 2008.*

Devarapalli et al. "Multiple Interface Support with Proxy Mobile IPv6" Nov. 12, 2007.*

3GPP Standard; "3rd Generation Partnership Project; Technical Specification Group Services and System Aspects; Architecture Enhancements for Non-3GPP Accesses (Release 8)" Mar. 1, 2008; pp. 1-163; No. V8.1.1; France.

Ericsson; "IP Address Preservation" S2-081362; Feb. 8, 2008; vol. SA WG2, No. Athens; Feb. 2, 2008; France.

Intel et al.; "On IPMS on Handover Between Accesses" 23402_CR0082R5_(REL-8)_S2-081965; vool. TSG SA, No. Puerto Vallarta, Mexico; Mar. 3, 2008.

* cited by examiner

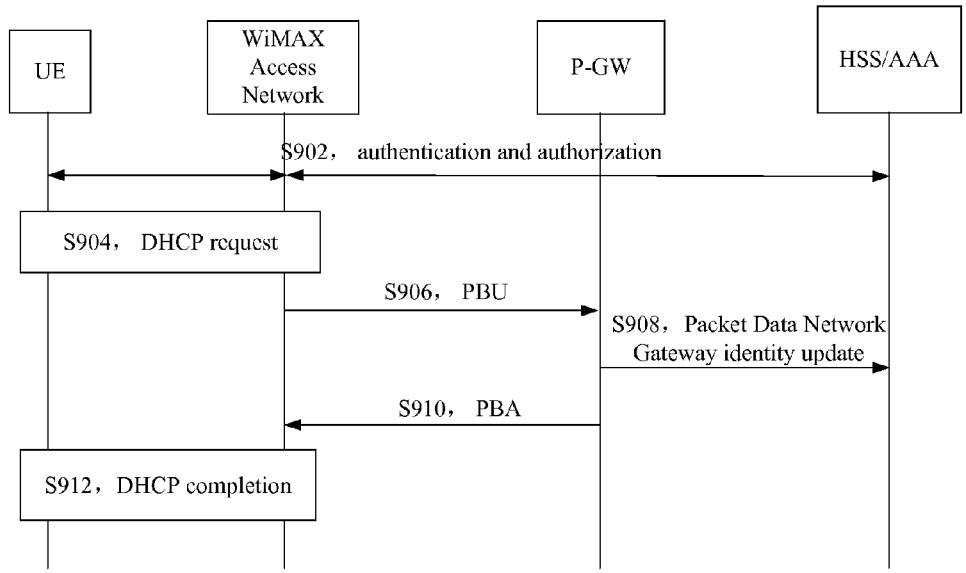
Fig.9
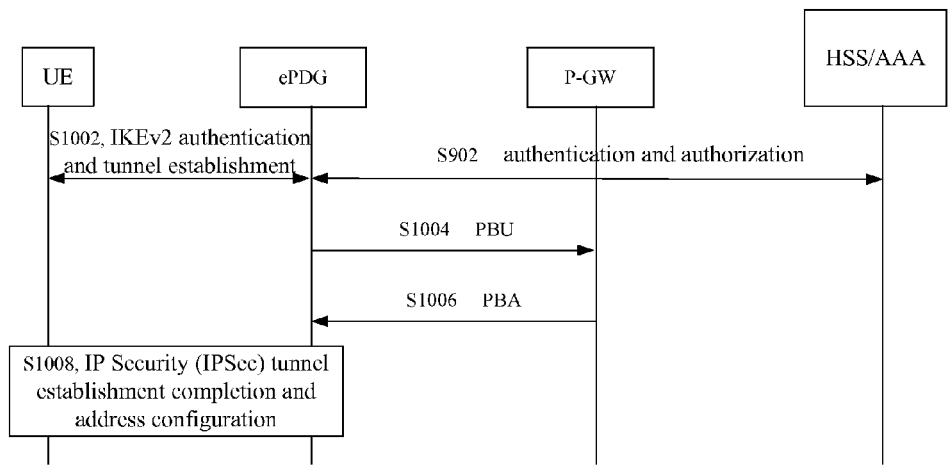
Fig.10 (Currently Amended)

METHOD AND SYSTEM FOR REALIZING NETWORK SWITCHING

CROSS-REFERENCE TO RELATED APPLICATIONS

This application is a National Phase application of International Application No. PCT/CN2008/073405, filed Sep. 12, 2009, which claims the benefit of Chinese Patent Application No. 200810124969.4, filed Jun. 20, 20008, both of which are incorporated herein by reference in their entirety.

FIELD OF THE INVENTION

The present invention relates to communication field, in particular to a method and system for realizing network switching, and a mobile node.

BACKGROUND OF THE INVENTION

Proxy Mobile Internet Protocol version 6 (PMIPv6) is a network layer scheme for offering mobility management on the Internet, and the protocol enables a Mobile Node (MN) to carry out link switching without interrupting the communication in progress.

The mobility management mechanism of PMIPv6 is that a network equipment acts as an agent to perform mobility management for the MN, so that the MN remains accessible through its IPv6 Home Network Prefix (HNP) and/or its IPv4 Home address when the MN moves on any link in a PMIPv6 Domain, viz. the IPv6 Home Network Prefix and/or the IPv4 Home address of the MN remain unchanged, the MN believes that no movement occurs to itself in the IP layer, and the ongoing service of the MN can remain to be continued.

FIG. 1 is a frame diagram of the PMIPv6 Domain. As shown in FIG. 1, the PMIPv6 Domain is mainly composed of a Local Mobility Anchor (LMA), a Mobile Access Gateway (MAG) and the MN, wherein the network is composed of the LMA and the MAG.

FIG. 2 is a frame diagram of an Evolved Packet System (EPS). In order to maintain the competence of the Third Generation Mobile Communication System in mobile communication filed, the network performance thereof must be improved, and the network construction and operation costs must be reduced. Thus, the standardization working group of the 3rd Generation Partnership Project (3GPP) is now working on the study of the evolution of the next generation of the core network system—Evolved Packet Core (EPC), for the purpose of providing higher transmission rate and shorter transmission delay for the users. The EPC system supports the access of Evolved Universal Terrestrial Radio Access Network (E-UTRAN); the EPC system also supports the access of Non-3GPP Access Network, e.g. Worldwide Interoperability for Microwave Access (WiMAX) Access Network.

As shown in FIG. 2, in the case when a User Equipment (UE) is in a non-roaming state, UE1 accesses the EPC through a Non-3GPP Access Network (including trusted and untrusted Non-3GPP Access Network), while UE2 accesses the EPC through the E-UTRAN. The UE herein refers to the MN described in the PMIPv6 protocol. The network elements shown in FIG. 2 also include: a Mobility Management Entity (MME), a Serving Gateway (S-GW), a Packet Data Network Gateway (PDN GW or P-GW), a Home Subscriber Server (HSS), a 3GPP Authentication and Authorization Accounting server (3GPP AAA Server), and an Evolved Packet Data Gateway (ePDG).

Wherein the MME is responsible for control-plane related work such as mobility management, the processing of non-access stratum signaling, and user context management; the S-GW is an access gateway equipment connected with the E-UTRAN, and is used for transmitting data between the E-UTRAN and the PDN GW; the P-GW is a boundary gateway between the 3GPP EPS and Internet Protocol (IP) services provided by the Home Public Land Mobile Network (HPLMN), and is responsible for the access of the IP services and the transmission of data between the EPS and an IP service network.

The EPS supports the use of PMIPv6 protocol between the S-GW and the P-GW and between the WiMAX access network and the P-GW, wherein the P-GW has the function of an LMA, the S-GW and the WiMAX access network have the function of MAG. The UE herein refers to the MN described in PMIPv6 protocol.

Non-3GPP wireless access network shown in FIG. 2 comprises the following two types:

Trusted Non 3GPP Access: a trust relation exists between the 3GPP Network and the non 3GPP access network, the non 3GPP access network can directly access the P-GW through an S2a interface, wherein the PMIPv6 can be used at the S2a interface.

Untrusted Non 3GPP Access: a trust relation does not exist between the 3GPP Network and the non 3GPP access network, the non 3GPP access network has to access the ePDG of the 3GPP network firstly, and then access the P-GW through an S2b interface. Herein a secure tunnel is established between the UE and the ePDG so as to ensure the secure transmission of the data between the UE and the 3GPP network. Wherein the PMIPv6 is used at the S2b interface.

The LMA is a home proxy of the MN within the PMIPv6 domain. Furthermore, the LMA is a topological anchor of the Home Network Prefix of the MN, is used for managing the binding state of the MN, wherein each binding state is corresponding to a Binding Cache Entry (BCE) managed by the LMA, and the content of the BCE comprises: an MN Identifier, an IPv6 Home Network Prefix and/or IPv4 Home Address currently used by the MN, service information currently used (viz. Access Point Name, APN).

The LMA can intercept data packets whose destination address is the IPv6 Home Network Prefix or the IPv4 Home Address of the MN within the management domain of the LMA, and can forward the data packets to a Proxy Care-of Address (Proxy-CoA) registered by the MN in the BCE. The Proxy-CoA is the address of the MAG, wherein the MAG is an access router which is used for tracking the movement of the MN, the movement of the MN herein comprises that the MN access or leave the access link; the MAG is also used as proxy for the MN attached to the access link of the MAG and for managing the signaling related to the mobility of the MN, including transmitting a Proxy Binding Update (PBU) to the LMA of the MN and receiving a Proxy Binding Acknowledgement (PBA) from the LMA. Through the PBU and the PBA, the MAG acts as an agent for the MN to establish, in the LMA, the binding state between the IPv6 Home Network Prefix or the IPv4 Home Address of the MN and the Proxy CoA, and the LMA stores the binding state as a BCE. After receiving a data packet whose destination address is the IPv6 Home Network Prefix or the IPv4 Home Address of the MN from the LMA, the MAG forwards the data packet to the MN.

The IPv6 Home Network Prefix is a permanent IPv6 address prefix which is allocated by the network to the MN for use in the PMIPv6 domain. The IPv4 Home Address is a permanent IPv4 address which is allocated by the network to the MN for use in the PMIPv6 domain. A standard IP routing mechanism will send an IP data packet which is sent to the IPv6 Home Network Prefix or the IPv4 Home Address of the MN to the PMIPv6 domain thereof, and the LMA is responsible for intercepting the IP data packet, then searching the BCE stored therein, and forwarding it to the corresponding MAG according to the Proxy CoA stored in the BCE, and then the MAG forwards the IP data packet to the corresponding MN according to the destination address or address prefix of the data packet.

Binding is an association relation between the IPv6 Home Network Prefix and/or the IPv4 Home Address of the MN and the Proxy CoA.

As shown in FIG. 1, in the PMIPv6 Domain, when the MN is switched from accessing the MAG1 through Interface 1 to accessing the MAG2 through Interface 2, the network needs to judge whether it is necessary to provide address preservation for the MN according to whether the MN has the ability of preserving address between different interfaces. The address preservation indicates that the IP address (including the IPv6 Home Network Prefix and/or the IPv4 Home Address) used at the interface before the switching of the MN is allocated to the interface for use after the switching of the MN. When the IPv6 Home Network Prefix and/or the IPv4 Home Address of the MN remain unchanged, the IP service used by the MN before the switching can be continually used after the switching, and the continuity of the service can be realized. If the network does not provide address preservation, the MN will obtain at Interface 2 an IPv6 Home Network Prefix and/or IPv4 Home Address different from that at Interface 1, and after the switching, the IP service previously performed at Interface 1 cannot be continued at Interface 2, and the IP service will be interrupted, viz. the switching fails.

Currently, if the network side knows that the MN has the ability, the network will preserve the address for the MN; if the network side does not know whether the MN has the ability, or if the network knows that the MN does not have the ability, the network will not provide the address preservation.

At present, as the network does not preserve the address before the switching for the MN under the cases that the network side cannot acquire whether the MN has the ability of address preservation between different interfaces, as a result, even for the MN which has the ability of address preservation between different interfaces, the network cannot preserve the address.

SUMMARY OF THE INVENTION

The present invention is provided in view of the problems that, for the MN having the ability of address preservation at different interfaces, the network side cannot preserve address for the MN when the network side cannot acquire the ability of the MN. Thus, the present invention aims at providing an improved solution for realizing network switching so as to solve at least one of the above problems.

To achieve the above objectives, according to an aspect of the present invention, a method for realizing network switching is provided.

The above method for realizing network switching is applied in a case that a Mobile Node, MN, is switched from a first Mobile Access Gateway to a second Mobile Access Gateway to access a Local Mobility Anchor, wherein the Mobile Node is connected with the first Mobile Access Gateway through a first interface, and connected with the second Mobile Access Gateway through a second interface, the method includes the following processing:

after receiving an IP address from the MN, a target network of the switching judges the access of the MN as a switching access and allocates the IP address to the MN.

Further, the IP address is an IP address acquired by the MN at the first Mobile Access Gateway.

Further, the target network of the switching comprises the second Mobile Access Gateway and the Local Mobility Anchor.

Further, if the Local Mobility Anchor judges the access of the MN as a switching access, the method provided by the present invention further comprises:

the Local Mobility Anchor receiving a Proxy Binding Update message from the second Mobile Access Gateway, wherein the Proxy Binding Update message carries identifier information of the Mobile Node, an IP address of the first interface, and an IP address of the second Mobile Access Gateway;

the Local Mobility Anchor checking whether the identifier information of the Mobile Node and the IP address of the first interface exist in a Binding Cache Entry stored therein;

in the case that the identifier information of the Mobile Node and the IP address of the first interface are found, the Local Mobility Anchor further judging whether a Proxy Care-of-Address in the Binding Cache Entry is the same as the Proxy Care-of-Address in the Proxy Binding Update message;

if the judging result is that the Proxy Care-of-Address in the Binding Cache Entry is different from the Proxy Care-of-Address in the Proxy Binding Update message, the Local Mobility Anchor judging that the connection of the Mobile Node is a switching connection, and if it is judged that the Mobile Node has an ability of address preservation, sending a Proxy Binding Acknowledgement message, which carries the IP address of the first interface, to the second Mobile Access Gateway.

Further, the Proxy Care-of-Address in the Proxy Binding Update message is the IP address of the second Mobile Access Gateway.

Further, the method for realizing network switching according to the present invention also comprises:

the second Mobile Access Gateway receiving the Proxy Binding Acknowledgement message, and sending the IP address of the first interface therein to the Mobile Node, such that the Mobile Node uses the IP address of the first interface at the second interface.

Further, before the Local Mobility Anchor receives the Proxy Binding Update message from the second Mobile Access Gateway, the method for realizing network switching according to the present invention further comprises:

the second Mobile Access Gateway receiving a connection request from the Mobile Node, wherein the connection request carries the IP address of the first interface and the identifier information of the Mobile Node;

the second Mobile Access Gateway sending the Proxy Binding Update message to the Local Mobility Anchor, the Proxy Binding Update message carrying the IP address of the first interface, the identifier information of the Mobile Node and the IP address of the second Mobile Access Gateway.

Further, the method for realizing network switching according to the present invention comprises:

after receiving the IP address from the MN, the second Mobile Access Gateway judging the access of the MN as a cross-interface switching access, and sending a Proxy Binding Update message, which carries a switching indication indicating that the switching is a cross-interface switching, to the Local Mobility Anchor;

the Local Mobility Anchor receiving the Proxy Binding Update message, and allocating the IP address to the MN;

wherein, the IP address is the IP address of the first interface of the MN.

To achieve the above objects, according to another aspect of the present invention, a system for realizing network switching is provided, the system is applied in a case that a Mobile Node is switched from a first Mobile Access Gateway to a second Mobile Access Gateway to access a Local Mobility Anchor, wherein the Mobile Node is connected with the first Mobile Access Gateway through a first interface, and connected with the second Mobile Access Gateway through a second interface.

The realizing system comprises: the Local Mobility Anchor and the second Mobile Access Gateway, wherein the Local Mobility Anchor specifically comprises:

a receiving module, configured to receive a Proxy Binding Update message from the second Mobile Access Gateway, wherein the Proxy Binding Update message carries identifier information of the Mobile Node, an IP address of the first interface, and an IP address of the second Mobile Access Gateway;

a first judging module, configured to search a Binding Cache Entry corresponding to the Mobile Node according to the identifier information of the Mobile Node, and to judge whether the IP address of the first interface and the identifier information of the Mobile Node exist in the Binding Cache Entry;

a second judging module, configured to judge whether a Proxy Care-of-Address in the Binding Cache Entry is the same as the IP address of the second Mobile Access Gateway in the Proxy Binding Update message;

a sending module, in the case that the judging result of the second judging module is that the Proxy Care-of-Address in the Binding Cache Entry is different from the IP address of the second Mobile Access Gateway in the Proxy Binding Update message, the Local Mobility Anchor is configured to judge the connection of the Mobile Node as a switching connection, to send a Proxy Binding Acknowledgement message to the second Mobile Access Gateway, and to carry the IP address of the first interface in the Proxy Binding Acknowledgement message.

Further, the second Mobile Access Gateway comprises:

a receiving and sending module, configured to receive the Proxy Binding Acknowledgement message, and to send the IP address of the first interface in the Proxy Binding Acknowledgement message to the Mobile Node, such that the Mobile Node uses the IP address of the first interface at the second interface.

Further, the receiving and sending module is also configured to receive a connection request from the Mobile Node and to send the Proxy Binding Update message to the Local Mobility Anchor; wherein the connection request carries the IP address of the first interface and the identifier information of the Mobile Node.

To achieve the above objects, according to still another aspect of the present invention, another system for realizing network switching is provided, it is applied in a case that a Mobile Node is switched from a first Mobile Access Gateway to a second Mobile Access Gateway to access a Local Mobility Anchor, wherein the Mobile Node is connected with the first Mobile Access Gateway through a first interface, and connected with the second Mobile Access Gateway through a second interface.

The system for realizing network switching according to the present invention comprises: the Local Mobility Anchor and the second Mobile Access Gateway, wherein the second Mobile Access Gateway specifically comprises:

a third judging module, configured to receive an IP address from the MN, to judge the access of the MN as a cross-interface switching access, and to send a Proxy Binding Update message to the Local Mobility Anchor, the message carrying a switching indication indicating that the switching is a cross-interface switching.

To achieve the above objects, according to still another aspect of the present invention, a mobile node is provided.

Wherein, in a case that the Mobile Node is switched from the first Mobile Access Gateway to the second Mobile Access Gateway to access a Local Mobility Anchor, the Mobile Node is configured to send a connection request to the second Mobile Access Gateway, wherein the connection request carries an IP address of the first interface.

In virtue of at least one of the above technical schemes, after receiving the IP address sent by the MN, the target network of the switching allocates the IP address to the MN when judging the access of the MN as a switching access, such that the network side can preserve the address before the switching for the user equipment having the ability of address preservation.

BRIEF DESCRIPTION OF THE ACCOMPANYING DRAWINGS

The drawings herein are used to provide further understanding of the present invention and form a part of the present application, and schematic embodiments of the present invention and description thereof are used to explain the present invention rather than unduly limit the present invention. In the accompanying drawings:

FIG. 9 is a flowchart according to Example 6 of the present invention;

FIG. 10 is a block diagram of a system for realizing network switching according to an embodiment of the present invention.

DETAILED DESCRIPTION OF THE PREFERRED EMBODIMENTS

Brief Description on Functions

In the technical scheme provided by the embodiments of the present invention, after receiving the IP address sent by the MN, the target network of the switching allocates the IP address to the MN when judging the access of the MN as a switching access, such that the network side can preserve the address before the switching for the user equipment having the ability of address preservation. Compared with the case that the network side does not preserve for the MN the address before the switching as the network side cannot acquire whether the MN has the ability of address preservation between different interfaces, the technical scheme provided by the embodiments of the present invention enables the interface after the switching to continually perform the IP service carried out at the original interface.

The preferred embodiments are described in conjunction with the drawings as follows. It shall be understood that the preferred embodiments described herein are only used to describe and explain the present invention and shall not be construed as improper limitations on the same. The embodiments of the present application and the features of the embodiments can be combined with each other if there is no conflict.

Method Embodiment

The embodiment of the present invention provides a method for realizing network switching.

Figure 1:
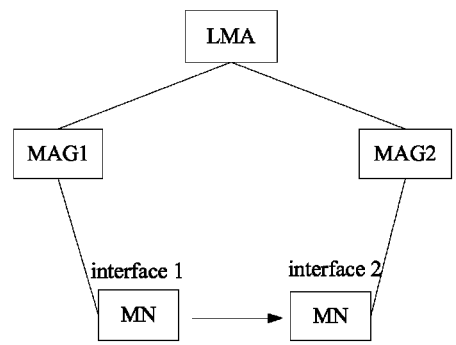
FIG. 1 is a frame diagram of the PMIPv6 domain according to the related art.
Figure 2:
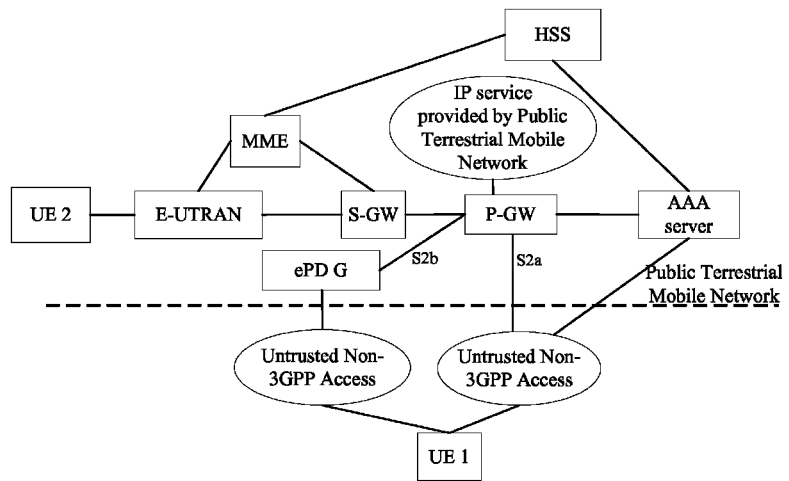
FIG. 2 is a frame diagram of the EPS system according to the related art.
Figure 3:
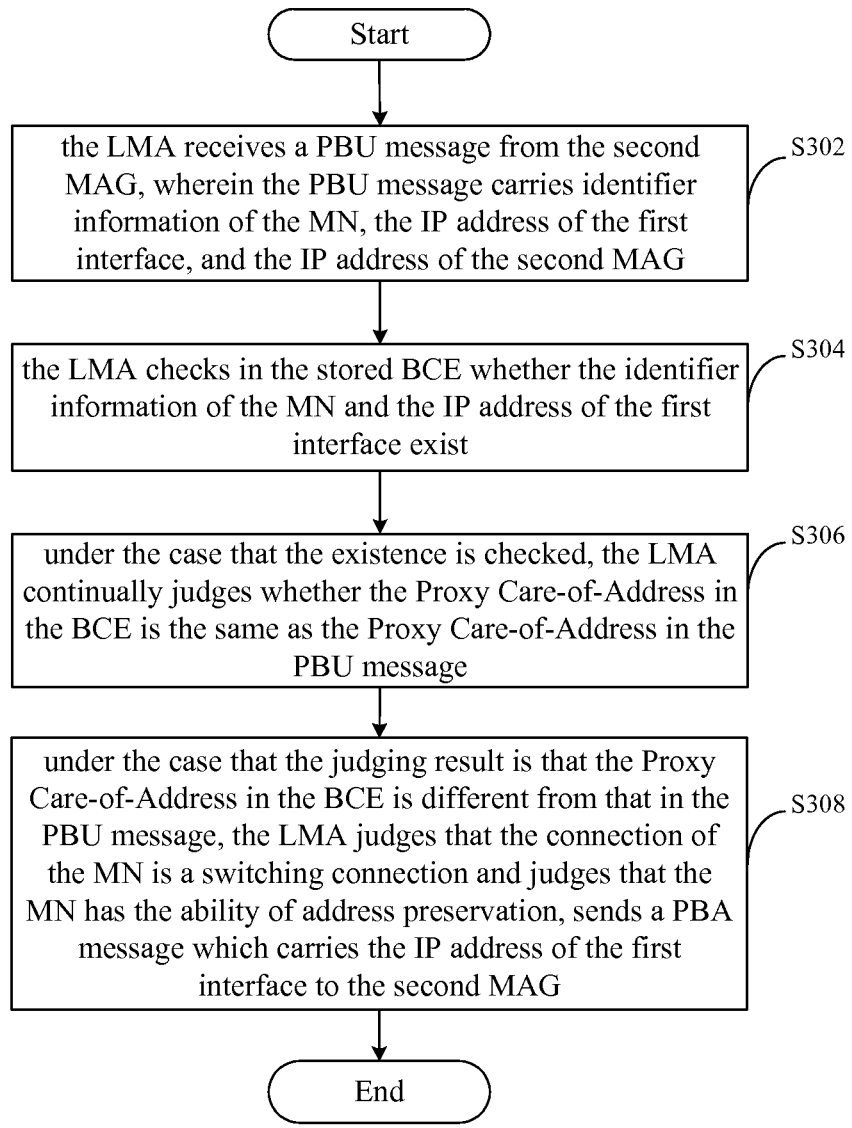
FIG. 3 is a flowchart of a method for realizing network switching according to an embodiment of the present invention.

FIG. 3 shows a method for realizing network switching according to an embodiment of the present invention. The method is applied in a case that an MN (or UE) is switched from a first MAG to a second MAG to access an LMA, wherein the MN is connected to the first MAG through a first interface, and to the second MAG through a second interface, the method for realizing network switching comprises the following processing:

Preferably, the second MAG receives a connection request from the MN firstly, wherein the connection request carries the IP address of the first interface and the identifier information of the MN; the second MAG sends a PBU message which carries the IP address of the first interface, the identifier information of the MN and the IP address of the second MAG to the LMA. Preferably, the second MAG receives a PBA message and sends the IP address of the first interface therein to the MN, such that the MN uses the IP address of the first interface at the second interface. Details are as specifically shown from Step S302 to Step S308 in FIG. 3.

Step S302, the LMA receives the PBU message from the second MAG; wherein the PBU message carries the identifier information of the MN, the IP address of the first interface, and the IP address of the second MAG, the Proxy Care-of-Address in the PBU message herein is the IP address of the second MAG Preferably, the IP address of the first interface specifically comprises: the IPv6 Home Network Prefix and/or the IPv4 Home address.

S304, the LMA checks in the BCE stored therein whether the identifier information of the MN and the IP address of the first interface exist.

S306, in the case that the identifier information of the MN and the IP address of the first interface are found, the LMA further judges whether the Proxy Care-of-Address in the BCE is the same as the Proxy Care-of-Address in the PBU message.

S308, in the case that the judging result in Step S306 is that the Proxy Care-of-Address in the BCE is different from the Proxy Care-of-Address in the PBU message, the LMA judges the connection of the MN as a switching connection, and judges that the mobile node has the ability of address preservation, thus sends a PBA message to the second MAG, and carries the IP address of the first interface in the PBA message.

Figure 4:
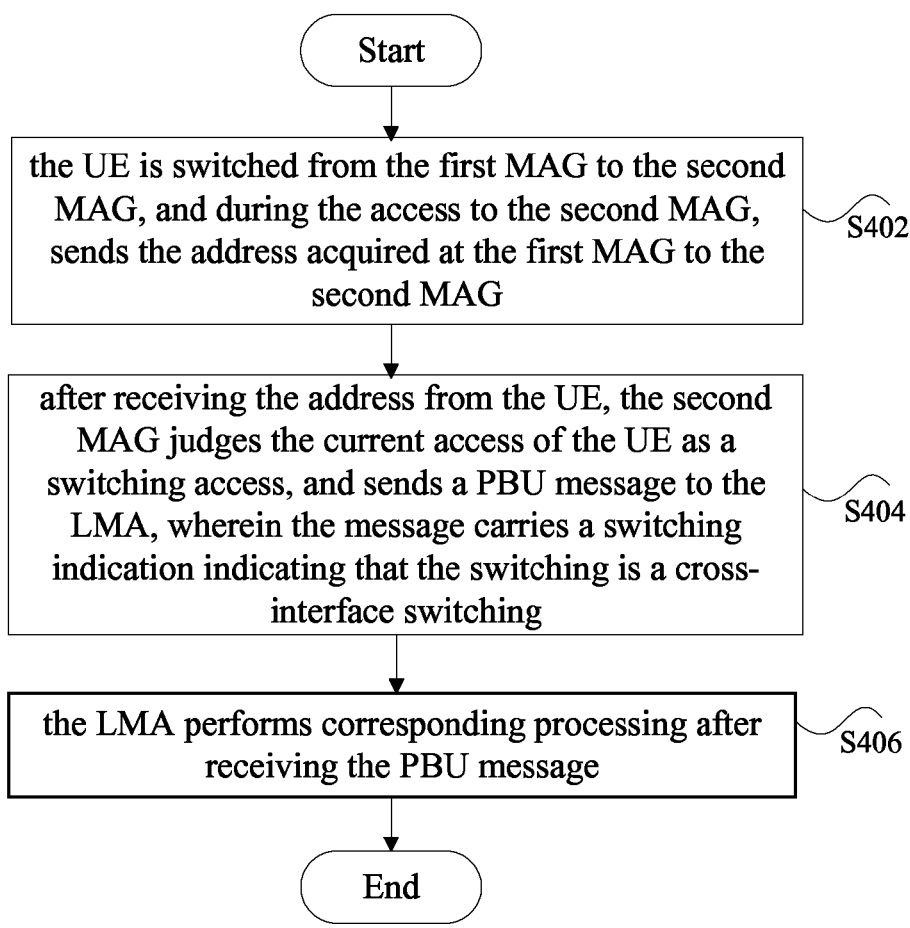
FIG. 4 is a flowchart according to Example 1 of the present invention.

FIG. 4 shows a method for realizing network switching according to an embodiment of the present invention. The method is applied in the case that the MN is switched from a first MAG to a second MAG to access the LMA, wherein the MN is connected to the first MAG through a first interface, and to the second MAG through a second interface, the method comprises the following processing (Step S402-Step S406):

S402, the MN is switched from the first mobile access gateway to the second mobile access gateway, and during the access to the second mobile access gateway, sends the address acquired at the first mobile access gateway to the second mobile access gateway;

S404, after receiving the address sent by the MN, the second mobile access gateway judges the current access of the MN as a switching access, and sends a Proxy Binding Update message to the Local Mobility Anchor, wherein a switching indication of cross-interface switching is set in the message, and the message can also carry the address sent by the MN;

S406, the Local Mobility Anchor performs corresponding processing after receiving the Proxy Binding Update message; specifically, one of the following processing methods may be included: (1) the Local Mobility Anchor performs switching processing according to the switching indication, sends the PBA message to the second MAG, and carries the IP address of the first interface in the PBA message; (2) the Local Mobility Anchor checks the address in the PBU (the address is the address sent by the MN) and the address in a BCE locally stored, and when the two addresses are inconsistent, judges the access as an incorrect access, and refuses the access of the MN; (3) the Local Mobility Anchor checks the address in the PBU and the address in the BCE locally stored, and when the two addresses are inconsistent, judges the access as an initial access, and allocates the address in the PBU to the MN for use, or allocates the address in the BCE to the MN for use, or allocates another address which is different from the address in the PBU and the address in the BCE.

The embodiments of the present invention are described respectively according to different connection request modes as follows.

Example 1

Figure 5:
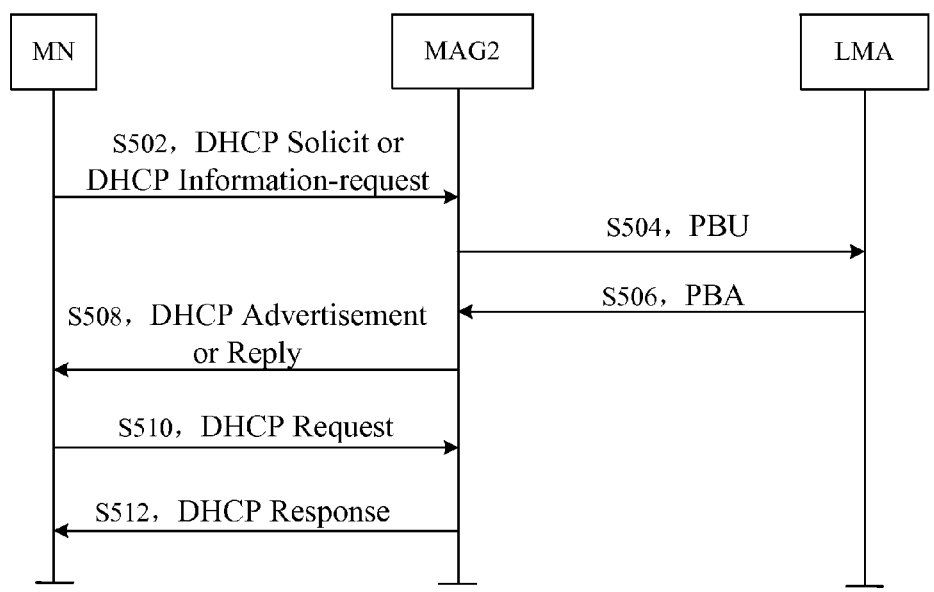
FIG. 5 is a flowchart according to Example 2 of the present invention.

In the example, the MN is switched from MAG1 to MAG2, the interface at which the MN is connected with MAG2 is different from the interface at which the MN is connected with MAG1, and the MN notifies MAG2 of the IP address (including the IPv6 HNP and/or the IPv4 Home address) used by the interface before the switching by means of DHCP. FIG. 5 is a flowchart according to method Example 1 of the present invention. As shown in FIG. 5, the method for realizing the network switching according to the embodiment of the present invention comprises the following steps (S502-S512):

S502, the MN is switched to MAG2, the MN processes according to the address configuration modes currently used, when Stateful Auto-Configuration mode is used, the MN initiates a Dynamic Host Configuration Protocol (DHCP) Solicit to MAG2; or the MN uses Stateless Auto-Configuration mode, and initiates a DHCP Information-request to MAG2. In the above DHCP Solicit and DHCP Information-request, the IP address of the interface before the switching is used as a source address and/or the IP address of the interface before the switching is used as the content of the request;

S504, according to the IPv6 HNP and/or the IPv4 Home Address (viz. the source address of the request and/or the content of the DHCP request) represented in the received request, MAG2 fills the IPv6 HNP into an IPv6 Home Network Prefix option of the PBU and/or fills the IPv4 Home Address into an IPv4 Home Address option of the PBU, and sends the PBU which carries an MN identifier to the LMA; or performs according to S404: after receiving the address sent by the MN, MAG2 judges the current access of the MN as a switching access, and sends a Proxy Binding Update message to the Local Mobility Anchor, wherein a switching instruction of cross-interface switching is set in the message;

S506, after receiving the PBU, the LMA searches the BCE stored in the LMA using the MN identifier and the IPv6 Home Network Prefix option and/or the IPv4 Home Address option in the PBU, and finds a BCE item which has the same user identity and the same IPv6 Home Network Prefix option and/or IPv4 Home Address option; the LMA checks the Proxy-CoA in the PBU and the Proxy-CoA in the BCE, as the IP address of MAG2 is different from the IP address of MAG1, the Proxy-CoA (viz. the IP address of MAG2) in the PBU is different from the Proxy-CoA (viz. the IP address of MAG1) in the BCE; thus, the LMA believes that a switching occurs to the MN, viz. regards the PBU as an update, and preserves address for the user during the updating process, viz. allocating the IPv6 Home Network Prefix and/or the IPv4 Home Address used at the interface of the MN before the switching to the interface of the MN after the switching for continuous use, and sending the IPv6 Home Network Prefix and/or the IPv4 Home Address to MAG2 through the PBA; or it can also be performed according to S406;

S508, when the Stateful Auto-Configuration is used, MAG2 sends a DHCP Advertise to the MN and sends the IPv6 Home Network Prefix and/or the IPv4 Home Address received in the PBA to the MN; when the Stateless Auto-Configuration is used, MAG2 sends a DHCP Reply to the MN, and sends the IPv6 Home Network Prefix and/or the IPv4 Home Address received in the PBA to the MN, the MN continually uses the IPv6 Home Network Prefix and/or the IPv4 Home Address at the new interface, and the switching process is completed;

S510, when the Stateful Auto-Configuration is used, the MN sends a DHCP Request to MAG2 to request the use of the IPv6 Home Network Prefix and/or the IPv4 Home Address received in S508;

S512, after receiving the request sent by the MN in S510, MAG2 sends a DHCP confirm to the MN to confirm that the MN can use the HNP received in S508, after receiving the confirm message, the MN continually uses the IPv6 Home Network Prefix and/or the IPv4 Home Address at the new interface, and the switching process is completed.

Example 2

In the example, the MN is switched from MAG1 to MAG2, the interface at which the MN is connected with MAG2 is different from the interface at which the MN is connected with MAG1, the MN informs, through a Route Solicit (RS), MAG2 of the IP address (including the IPv6 Home Network Prefix and/or the IPv4 Home Address) used at the interface before the switching.

Figure 6:
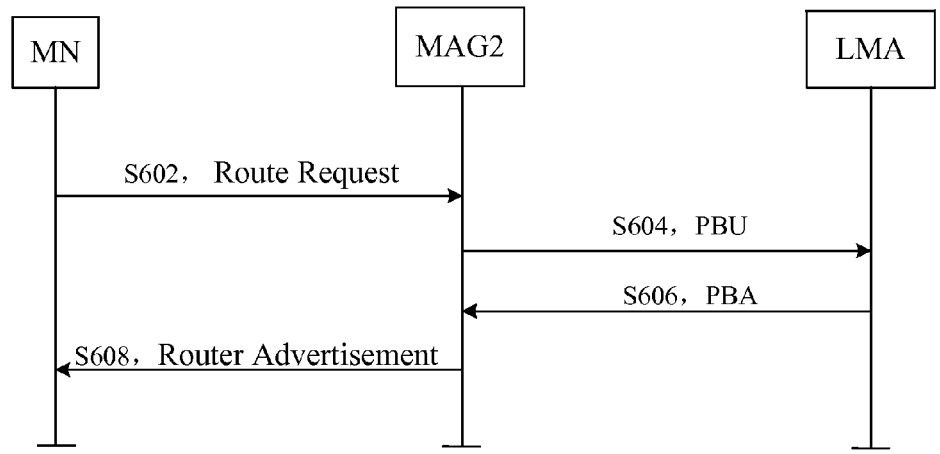
FIG. 6 is a flowchart according to Example 3 of the present invention.

FIG. 6 is a flowchart according to method Example 2 of the present invention, as shown in FIG. 6, the method for realizing network switching according to an embodiment of the present invention comprises the following steps S602-S608:

S602, the MN is switched to MAG2, uses the IPv6 Home Network Prefix and/or the IPv4 Home Address of the interface before the switching as a source address of the Route Solicit, and sends the RS to MAG2.

S604, MAG2 receives the source address of the Route Solicit, fills the source address into the IPv6 Home Network Prefix option and/or into the IPv4 Home Address option of a PBU, sends the PBU to the LMA, user identity being included in the PBU; or the step can also be performed according to the above Step S404;

Step S606, the LMA sends a PBA to MAG2, wherein the PBA contains the IPv6 Home Network Prefix and/or the IPv4 Home Address of the MN; or the step can also be performed according to Step S406;

Step S608, MAG2 sends a Router Advertisement to the MN, informs the MN of the HNP, the MN continually uses the IPv6 Home Network Prefix and/or the IPv4 Home Address, and the switching process is completed.

Example 3

In the example, the MN is switched from MAG1 to MAG2, the interface at which the MN is connected with MAG2 is different from the interface at which the MN is connected with MAG1, the MN informs MAG2 of the IP address (including the IPv6 Home Network Prefix and/or the IPv4 Home Address) used at the interface before the switching through a layer 2 attachment request.

Figure 7:
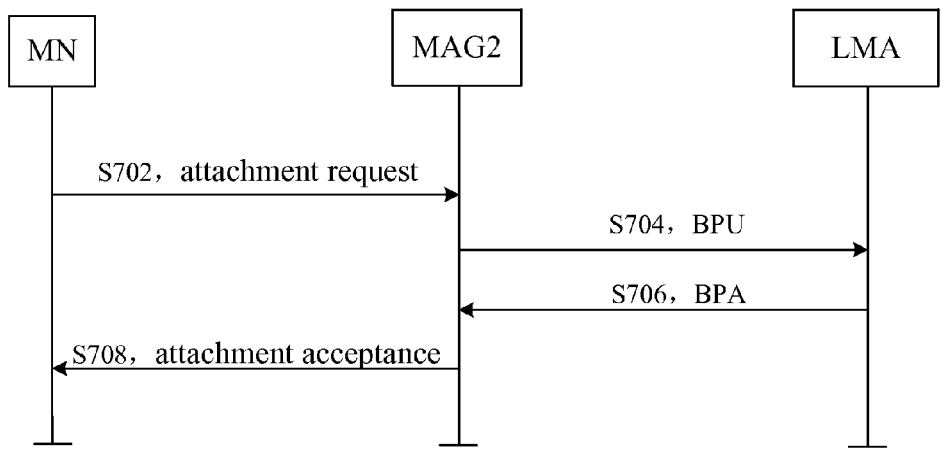
FIG. 7 is a flowchart according to Example 4 of the present invention.

FIG. 7 is a flowchart according to method Example 3 of the present invention, as shown in FIG. 7, the method for realizing network switching according to an embodiment of the present invention comprises the following Step S702-Step S708:

S702, the MN is switched to MAG2, and initiates a layer 2 (link layer) attachment request to MAG2, the request containing the IPv6 Home Network Prefix and/or the IPv4 Home Address obtained by the MN when attached to MAG1;

S704, MAG2 receives the IPv6 Home Network Prefix and/or the IPv4 Home Address in the attachment request, fills the IPv6 Home Network Prefix and/or the IPv4 Home Address into the IPv6 Home Network Prefix option and/or into the IPv4 Home Address option of a PBU, and sends the PBU to the LMA, user identity being included in the PBU; or the step can also be performed according to Step S404;

S706, the LMA sends a PBA to MAG2, wherein the PBA contains the IPv6 Home Network Prefix and/or the IPv4 Home Address of the MN; or the step can also be performed according to Step S406;

Step S708, MAG2 sends an attachment accepting message to the MN, wherein the attachment accepting message contains the IPv6 Home Network Prefix and/or the IPv4 Home Address of the MN, after receiving the attachment accepting message, the MN continually uses the IPv6 Home Network Prefix and/or the IPv4 Home Address at the new interface, and the switching process is completed.

Example 4

The embodiment describes that a UE is switched from a Non-3GPP access network (including trusted or untrusted Non-3GPP access network) to an E-UTRAN, the interface at which the UE is connected with the E-UTRAN is different from the interface at which the UE is connected with the Non-3GPP access network, the UE informs, through sending a layer 2 attachment request or a PDN connection request sent to the E-UTRAN, the S-GW of the IP address (including the IPv6 Home Network Prefix and/or the IPv4 Home Address) used at the interface before the switching.

Figure 8:
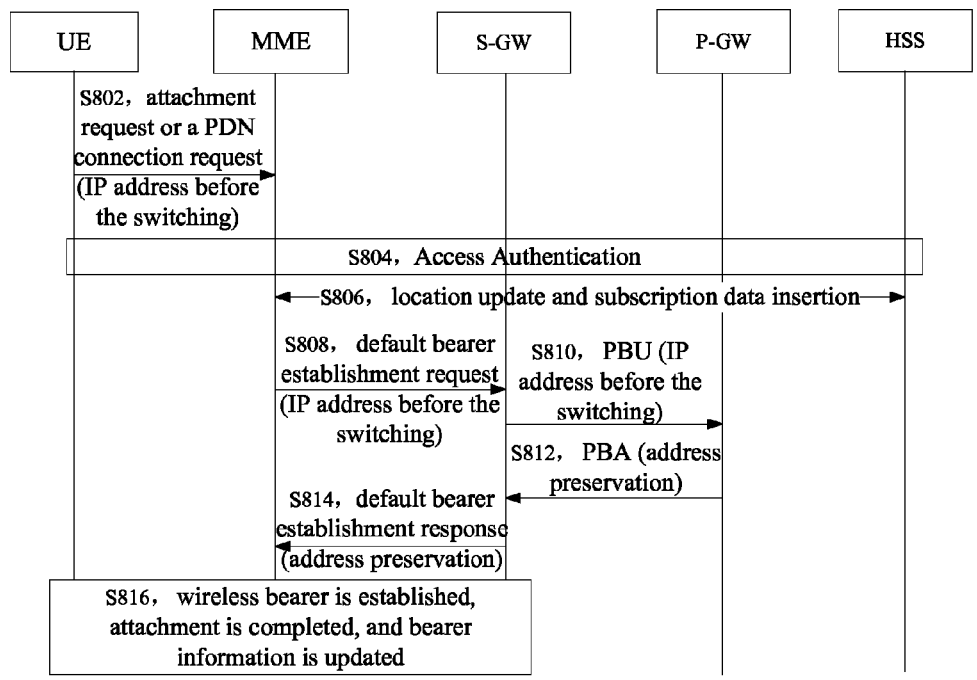
FIG. 8 is a flowchart according to Example 5 of the present invention.

FIG. 8 is a flowchart according to method Example 4 of the present invention, wherein the Non-3GPP access network is a WIMAX access network. As shown in FIG. 8, the method for realizing network switching according to an embodiment of the present invention comprises the following Step S802-Step S816:

S802, the UE is switched to the E-UTRAN, and initiates an attachment request or a PDN connection request to the MME, the attachment request containing a UE identifier and the IP address (including the IPv6 Home Network Prefix and/or the IPv4 Home Address) used at the interface for connecting the WiMAX access network before the switching, the connection request further contains an Access Point Name (APN) when the MME sends the PDN connection request.

S804, the MME, the HSS and the UE collectively carries out Access Authentication for the UE, verifies user identity and allows the UE to access the EPC; when, in Step S802, the MME initiates a PDN connection request, it is not necessary to perform Step S804;

S806, the MME initiates a location update to the HSS to update the current location information of the UE in the HSS, at the same time, the HSS initiates a subscription data inserting process to the MME, sends user subscription data to the MME, and the MME stores the user subscription information; when in Step S802, the MME initiates the PDN connection request, it is not necessary to perform Step S806;

S808, when the MME initiates the attachment request in Step S802, the MME finds a P-GW which can provide the service corresponding to the APN according to default APN (default Access Point Name) represented in the user subscription information, or when the MME initiates the PDN connection request in Step S802, the MME can find the P-GW which can provide the service corresponding to the APN according to the APN included in the request; and at the same time, selects an S-GW which can communicate with the P-GW, initiates a default bearer establishment request to the S-GW, wherein the default bearer request contains user identity and the IP address (including the IPv6 Home Network Prefix and/or the IPv4 Home Address) used at the interface for connecting the WiMAX access network before the switching, as well as default APN or APN;

Step S810, the S-GW fills, according to the IPv6 Home Network Prefix and/or the IPv4 Home Address in the default bearer establishment request received in Step S808, the IPv6 Home Network Prefix into the IPv6 Home Network Prefix option of a PBU, and/or fills the IPv4 Home Address into the IPv4 Home Address option of the PBU, and sends the PBU to the P-GW, the PBU also containing user identity and default APN or APN; or the step can also be performed according to Step S404;

Step S812, after receiving the PBU, the P-GW searches the BCE stored therein using the user identity, the IPv6 Home Network Prefix option and/or the IPv4 Home Address option, default APN or APN in the PBU, finds a BCE item which has the same user identity, IPv6 Home Network Prefix option and/or IPv4 Home Address option and default APN or APN; the P-GW checks the Proxy-CoA in the PBU and the Proxy-CoA in the BCE, as the IP address of the S-GW is different from the IP address of the MAG to which the UE is previously accessed in the Non-3GPP, the Proxy-CoA in the PBU is different from the Proxy-CoA in the BCE, thus, the P-GW believes that a switching occurs to the UE, viz. regards it as an updated PBU, preserves address for the user during the updating, and allocates the IPv6 Home Network Prefix and/or the IPv4 Home Address used for the UE to access the WiMAX before the switching to the interface of the UE after being switched to the E-UTRAN for continuous use, and sends the IPv6 Home Network Prefix and/or the IPv4 Home Address to the S-GW through a PBA; or the step can also be performed according to Step S406;

Step S814, the S-GW sends the IPv6 Home Network Prefix and/or the IPv4 Home Address received in the PBA to the MME using a default bearer establishment response message;

Step S816, the MME informs wireless network of the completion of the attachment, a wireless bearer is established between the wireless network and the UE, the MME informs the UE of the IPv6 Home Network Prefix and/or the IPv4 Home Address through the wireless network, the UE continually uses the IPv6 Home Network Prefix and/or the IPv4 Home Address, and completes the switching from the Non-3GPP access network to the E-UTRAN.

Example 5

The embodiment describes that a UE is switched from an E-UTRAN to a WiMAX access network and access an EPC through the WiMAX access network; the interface at which the UE is connected with the E-UTRAN is different from the interface at which the UE is connected with the WiMAX access network, the UE informs the WiMAX access network of the IP address (including IPv6 Home Network Prefix and/or the IPv4 Home Address) used at the interface before the switching through a DHCP request sent to the WiMAX.

FIG. 9 is a flowchart according to method Example 5 of the present invention. As shown in FIG. 9, the method for realizing network switching according to an embodiment of the present invention comprises the following steps S902-S912:

Step S902, the UE accesses the WiMAX access network and sends user identity to the WiMAX access network, the WiMAX access network communicates with HSS/AAA and carries out authentication and authorization on the user;

Step S904, after the user passes the authentication and the authorization, the UE initiates a DHCP request, the process of the DHCP request is similar to that in the above Step S502, and will not be illustrated here anymore;

Step S906, according to the IPv6 HNP and/or the IPv4 Home address (viz. the source address of the request and/or the content of the DHCP request) represented in the DHCP request which is received in Step S904, the WiMAX access network fills the IPv6 HNP into an IPv6 Home Network Prefix option of a Proxy Binding Update message (PBU) and/or fills the IPv4 Home Address into an IPv4 Home Address option of a Proxy Binding Update message (PBU), and sends the PBU to a P-GW, the user identity being included in the PBU; or the step can also be performed according to Step S404;

Step S908, after receiving the PBU, the P-GW initiates an update of the P-GW identity to the HSS/AAA, and informs its own P-GW identity information to the HSS/AAA, and the HSS/AAA stores the information;

Step S910, after receiving the PBU, the P-GW searches the BCE stored therein using the user identity, the IPv6 Home Network Prefix option and/or the IPv4 Home Address option in the PBU, and finds a BCE item which has the same user identity, IPv6 Home Network Prefix option and/or IPv4 Home Address option; the P-GW checks the Proxy-CoA in the PBU and the Proxy-CoA in the BCE, as the IP address of the WiMAX access network gateway is different from the IP address of the MAG (viz. the S-GW) to which the UE is previously accessed in the E-UTRAN, the Proxy-CoA in the PBU is different from the Proxy-CoA in the BCE, thus, the P-GW believes that a switching occurs to the UE, viz. regards the PBU as an update, preserves address for the user during the updating, allocates the IPv6 Home Network Prefix and/or the IPv4 Home Address used by the UE in the E-UTRAN before the switching to the interface used by the UE for the access in the WiMAX after the switching for continuous use, and sends the IPv6 Home Network Prefix and/or the IPv4

Home Address to the WiMAX access network through a PBA; or the step can also be performed according to Step S406;

Step S912, the WiMAX access network sends the IPv6 Home Network Prefix and/or the IPv4 Home Address received in the PBA to the UE by means of the DHCP, the UE continually uses the IPv6 Home Network Prefix and/or the IPv4 Home Address to complete the switching from the E-UTRAN to the WiMAX.

Example 6

The embodiment describes that a UE is switched from an E-UTRAN to an untrusted Non-3GPP access network, and accesses the EPC through the untrusted Non-3GPP access network; the interface at which the UE is connected with the E-UTRAN is different from the interface at which the UE is connected with the untrusted Non-3GPP access network. As the Non-3GPP access network is untrusted, the UE needs to initiate an establishment of a tunnel connection to an ePDG. In the process of the authentication of IKEv2 (Internet Key Exchange version 2) and the tunnel establishment with the ePDG, the UE carries the IPv6 Home Network Prefix and/or the IPv4 Home Address of the interface before the switching in a configuration payload (CFG_REQUEST) in the IKE_AUTH Request message to the ePDG.

FIG. 10 is a flowchart according to method Example 6 of the present invention. As shown in FIG. 10, the method for realizing network switching according to an embodiment of the present invention comprises the following steps S1002-S1008:

Step S1002, the UE is switched from the E-UTRAN to the untrusted Non-3GPP access network, the UE finds an IP address of the ePDG according to the IP address of the ePDG configured internally or through a DNS (Domain Name Server), initiates a request for IKEv2 authentication and tunnel establishment to the ePDG, in the process of the IKEv2 authentication, the UE carries the IPv6 Home Network Prefix and/or the IPv4 Home Address of the interface before the switching in a CFG_REQUEST (configuration request) in the configuration payload in the IKE_AUTH Request message to the ePDG, The IKE_AUTH Request also contains an APN used by the UE before the switching;

Step S1004, according to the IPv6 HNP and/or the IPv4 Home Address represented in the CFG_REQUEST which is received in Step S1002, the ePDG fills the IPv6 HNP into the IPv6 Home Network Prefix option of a Binding Update message (PBU) and/or fills the IPv4 Home Address into an IPv4 Home Address option of a Binding Update message, and sends the PBU to a P-GW, the PBU also contains user identity NAI (Network Access Identifier) and APN; or the step can also be performed according to Step S404;

Step S1006, after receiving the PBU, the P-GW searches a BCE stored therein using the user identity NAI, the APN, and the IPv6 Home Network Prefix option and/or the IPv4 Home Address option in the PBU to find a BCE item which has the same user identity, APN, and IPv6 Home Network Prefix option and/or IPv4 Home Address option; the P-GW checks the Proxy-CoA in the PBU and the Proxy-CoA in the BCE, as the IP address of the ePDG is different from the IP address of an MAG (viz. the S-GW) to which the UE is previously accessed in the E-UTRAN, the Proxy-CoA in the PBU is different from the Proxy-CoA in the BCE, thus, the P-GW believes that a switching occurs to the UE, viz. the PUB is updated, preserves address for the user during the updating, allocates the IPv6 Home Network Prefix and/or the IPv4 Home Address used by the UE in the E-UTRAN before the switching to a new interface for continuous use after the switching of the UE, and sends the IPv6 Home Network Prefix and/or the IPv4 Home Address to the ePDG through a PBA; or the step can also be performed according to Step S406;

Step S1008, in the process of the IKEv2 authentication, the ePDG sends an IKE_AUTH Response (IKE authentication response) message to the UE, wherein the configuration payload in the message contains CFG_REPLY (configuration reply), and the CFG_REPLY carries the IPv6 Home Network Prefix and/or the IPv4 Home Address received in the PBA. The UE continually uses the IPv6 Home Network Prefix and/or the IPv4 Home Address at a new interface, and completes the switching from the E-UTRAN to the untrusted Non-3GPP access network.

Example 7

An MN initially accesses an MAG, the MN does not carry an IP address in the access process, and the network believes that the access is an initial access. The MN can be connected with the MAG in the manner as described in Examples 1, 2, 3, 4, 5, and 6, and this will not be described here anymore.

Figure 11:
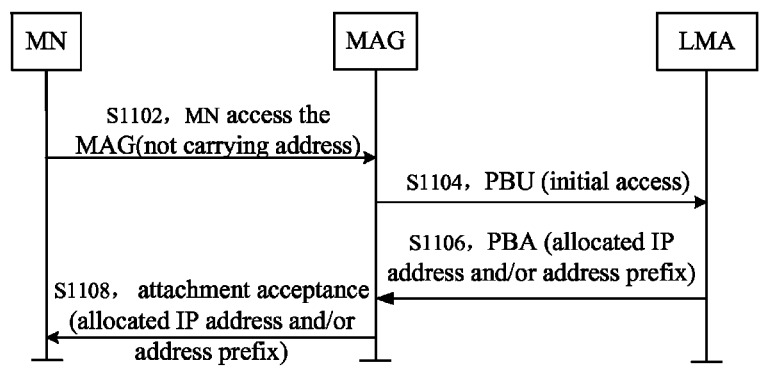

FIG. 11 is a flowchart according to method Example 7 of the present invention. As shown in FIG. 11, the method for realizing network switching according to an embodiment of the present invention comprises the following Step S1102-Step S1108:

Step S1102, when accessing the MAG, the MN does not carry an IP address to the MAG in the access process, which indicates that the attachment is an initial attachment;

Step S1104, the MAG believes that the access of the MN is an initial attachment according to that the MAG did not receive an address from the MN in the attachment process of the MN, and sends a Proxy Binding Update message to an LMA;

Step S1106, after receiving the message, the LMA allocates an IP address and/or an address prefix and sends the allocated IP address and/or address prefix to the MAG in a Proxy Binding Acknowledgement message;

Step S1108, the MAG sends the IP address allocated by the LMA to the MN.

System Embodiment

A system for realizing network switching is provided in an embodiment of the present invention.

Figure 12:
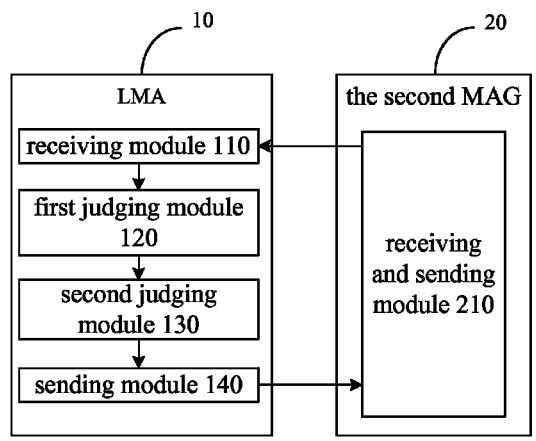

FIG. 12 is a block diagram of a system for realizing network switching according to an embodiment of the present invention. The system is used in a case that an MN is switched from a first MAG to a second MAG for the access of an LMA, wherein the MN is connected with the first MAG through a first interface and connected with the second MAG through a second interface. The realizing system comprises: LMA 10 and the second MAG 20, wherein LMA 10 specifically comprises: a receiving module 110 connected with the second MAG 20, configured to receive a PBU message from the second MAG 20, wherein the PBU message carries identifier information of the MN, an IP address of the first interface and an IP address of the second MAG; a first judging module 120 connected with the receiving module 110, configured to search, according to the identifier information of the MN and APN information (when the APN information exists) a BCE corresponding to the MN and the APN, and to judge whether the IP address of the first interface exists in the BCE searched, when the judging result is that the IP address of the first interface exists in the BCE searched, a second judging module 130 is executed; the second judging module 130, configured to judge whether a Proxy Care-of-Address in the BCE searched and the IP address of the second MAG in the PBU message are the same; a sending module 140 connected with the second judging module 130, configured for the LMA to judge the connection of the MN as a switching connection when the judging result of the second judging module 130 is that the Proxy Care-of-Address in the BCE searched and the IP address of the second MAG in the PBU message are different, and to send a PBA message to the second MAG and carry the IP address of the first interface in the PBA message.

Preferably, the second MAG 20 specifically comprises: a receiving and sending module 210 connected with the sending module 140, configured to receive the PBA message and to send the IP address of the first interface in the PBA message to the MN, such that the MN uses the IP address of the first interface at the second interface.

Preferably, the receiving and sending module 210 is also configured to receive a connection request from the MN, and to send the PBU message to the LMA, wherein the connection request carries the IP address of the first interface and the identifier information of the MN.

In addition, a system for realizing network switching is also provided by the present invention, and the system is applied in a case that a mobile node is switched from a first mobile access gateway to a second mobile access gateway for the access of a Local Mobility Anchor, wherein the mobile node is connected with the first mobile access gateway through a first interface, and connected with the second mobile access gateway through a second interface. The system comprises: the Local Mobility Anchor and the second mobile access gateway; wherein the second mobile access gateway specifically comprises: a third judging module, configured, after receiving an IP address from the MN, to judge the access of the MN as a cross-interface switching access, and to send a Proxy Binding Update message to the Local Mobility Anchor, the message carrying an switching indication indicating that the switching is a cross-interface switching.

Apparatus Embodiment

The embodiment of the present invention provides an MN. According to an embodiment of the present invention, under a case that the MN is switched from a first MAG to a second MAG for the access of an LMA, the MN is configured to send a connection request to the second MAG, wherein the connection request carries the IP address of the first interface. Preferably, the MN here can be the MN in the above method embodiments, and this will not be illustrated here anymore.

To sum up, with the above embodiments of the present invention, the address can be preserved for the user equipment having the ability of address preservation.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storage device and executed by the calculating device, or they can be made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for realizing network switching, applied in a case that a Mobile Node (MN) is switched from a first Mobile Access Gateway to a second Mobile Access Gateway to access a Local Mobility Anchor, wherein the Mobile Node is connected with the first Mobile Access Gateway through a first interface, and connected with the second Mobile Access Gateway through a second interface, comprising:

receiving in a target network of the network switching an Internet Protocol (IP) address of the first interface from the MN; and after receiving the IP address of the first interface from the MN, the target network of the network switching judging the access of the MN as a switching access and allocating the IP address to the MN;

wherein the IP address of the first interface comprises: an IPv6 Home Network Prefix and/or an IPv4 Home address;

wherein the target network of the network switching comprises the second Mobile Access Gateway and the Local Mobility Anchor, and the method also comprising the following if the Local Mobility Anchor judges the access of the MN as a switching access: the Local Mobility Anchor receiving a Proxy Binding Update message from the second Mobile Access Gateway, wherein the Proxy Binding Update message carries identifier information of the Mobile Node, an IP address of the first interface, and an IP address of the second Mobile Access Gateway;

the Local Mobility Anchor checking whether the identifier information of the Mobile Node and the IP address of the first interface exist in a Binding Cache Entry stored therein; in the case that the identifier information of the Mobile Node and the IP address of the first interface are found, the Local Mobility Anchor further judging whether a Proxy Care-of-Address in the Binding Cache Entry is the same as the Proxy Care-of-Address in the Proxy Binding Update message;

if the judging result is that the Proxy Care-of-Address in the Binding Cache Entry is different from the Proxy Care-of-Address in the Proxy Binding Update message, the Local Mobility Anchor judging that the connection of the Mobile Node is a switching connection, and if it is judged that the Mobile Node has an ability of address preservation, sending a Proxy Binding Acknowledgement message, which carries the IP address of the first interface, to the second Mobile Access Gateway.

2. The method according to claim 1, wherein the IP address is an IP address acquired by the MN at the first Mobile Access Gateway.

3. The method according to claim 1, wherein the Proxy Care-of-Address in the Proxy Binding Update message is the IP address of the second Mobile Access Gateway.

4. The method according to claim 1, wherein the method also comprises:

the second Mobile Access Gateway receiving the Proxy Binding Acknowledgement message, and sending the IP address of the first interface therein to the Mobile Node, such that the Mobile Node uses the IP address of the first interface at the second interface.

5. The method according to claim 1, wherein before the Local Mobility Anchor receives the Proxy Binding Update message from the second Mobile Access Gateway, the method also comprises:

the second Mobile Access Gateway receiving a connection request from the Mobile Node, wherein the connection request carries the IP address of the first interface and the identifier information of the Mobile Node;

the second Mobile Access Gateway sending the Proxy Binding Update message to the Local Mobility Anchor, the Proxy Binding Update message carrying the IP address of the first interface, the identifier information of the Mobile Node and the IP address of the second Mobile Access Gateway.

6. The method according to claim 1, if the second Mobile Access Gateway judges the access of the MN as a switching access, wherein the method comprises:

after receiving the IP address from the MN, the second Mobile Access Gateway judging the access of the MN as a cross-interface switching access, and sending a Proxy Binding Update message, which carries a switching indication indicating that the switching is a cross-interface switching, to the Local Mobility Anchor;

the Local Mobility Anchor receiving the Proxy Binding Update message, and allocating the IP address to the MN.

7. A system for realizing network switching, applied in a case that a Mobile Node is switched from a first Mobile Access Gateway to a second Mobile Access Gateway to access a Local Mobility Anchor, wherein the Mobile Node is connected with the first Mobile Access Gateway through a first interface, and connected with the second Mobile Access Gateway through a second interface, the system comprising:

the second Mobile Access Gateway, configured to receive an internet protocol (IP) address of the first interface from the MN and judge the access of the MN as a switching access, wherein the IP address of the first interface comprises: an IPv6 Home Network Prefix and/or an IPv4 Home address; and the Local Mobility Anchor, configured to allocate the IP address to the MN after the second Mobile Access Gateway judges the access of the MN as a switching access;

wherein the Local Mobility Anchor specifically comprises:
a receiving module, configured to receive a Proxy Binding Update message from the second Mobile Access Gateway, wherein the Proxy Binding Update message carries identifier information of the Mobile Node, the IP address of the first interface, and an IP address of the second Mobile Access Gateway;

a first judging module, configured to search a Binding Cache Entry corresponding to the Mobile Node according to the identifier information of the Mobile Node, and to judge whether the IP address of the first interface and the identifier information of the Mobile Node exist in the Binding Cache Entry;

a second judging module, configured to judge whether a Proxy Care-of-Address in the Binding Cache Entry is the same as the IP address of the second Mobile Access Gateway in the Proxy Binding Update message;

a sending module, in the case that the judging result of the second judging module is that the Proxy Care-of-Address in the Binding Cache Entry is different from the IP address of the second Mobile Access Gateway in the Proxy Binding Update message, the Local Mobility Anchor is configured to judge the connection of the Mobile Node as a switching connection, to send a Proxy Binding Acknowledgement message to the second Mobile Access Gateway, and to carry the IP address of the first interface in the Proxy Binding Acknowledgement message.

8. The system according to claim 7, wherein the second Mobile Access Gateway comprises:

a receiving and sending module, configured to receive the Proxy Binding Acknowledgement message, and to send the IP address of the first interface in the Proxy Binding Acknowledgement message to the Mobile Node, such that the Mobile Node uses the IP address of the first interface at the second interface.

9. The system according to claim 7, wherein the receiving and sending module is also configured to receive a connection request from the Mobile Node and to send the Proxy Binding Update message to the Local Mobility Anchor; wherein the connection request carries the IP address of the first interface and the identifier information of the Mobile Node.

10. A system for realizing network switching, applied in a case that a Mobile Node is switched from a first Mobile Access Gateway to a second Mobile Access Gateway to access a Local Mobility Anchor, wherein the Mobile Node is connected with the first Mobile Access Gateway through a first interface, and connected with the second Mobile Access Gateway through a second interface, wherein the system comprises:

the second Mobile Access Gateway, configured to receive an internet protocol (IP) address of the first interface from the MN and judge the access of the MN as a switching access, wherein the IP address of the first interface comprises: an IPv6 Home Network Prefix and/or an IPv4 Home address; and the Local Mobility Anchor, configured to allocate the IP address to the MN after the second Mobile Access Gateway judges the access of the MN as a switching access;

wherein the second Mobile Access Gateway specifically comprises:

a judging module, configured to receive the IP address from the MN, to judge the access of the MN as a cross-interface switching access, and to send a Proxy Binding Update message to the Local Mobility Anchor, the message carrying a switching indication indicating that the switching is a cross-interface switching:

wherein the Local Mobility Anchor is configure to:
receive a Proxy Binding Update message from the second Mobile Access Gateway, wherein the Proxy Binding Update message carries identifier information of the Mobile Node, an IP address of the first interface, and an IP address of the second Mobile Access Gateway;

check whether the identifier information of the Mobile Node and the IP address of the first interface exist in a Binding Cache Entry stored therein; in the case that the identifier information of the Mobile Node and the IP address of the first interface are found, further judge whether a Proxy Care-of-Address in the Binding Cache Entry is the same as the Proxy Care-of-Address in the Proxy Binding Update message;

if the judging result is that the Proxy Care-of-Address in the Binding Cache Entry is different from the Proxy Care-of-Address in the Proxy Binding Update message, judge that the connection of the Mobile Node is a switching connection, and if it is judged that the Mobile Node has an ability of address preservation, send a Proxy Binding Acknowledgement message, which carries the IP address of the first interface, to the second Mobile Access Gateway.

11. A Mobile Node, comprising a sending module configured to send a connection request to a second Mobile Access Gateway in a case where the Mobile Node is switched from a first Mobile Access Gateway to the second Mobile Access Gateway to access a Local Mobility Anchor; a receiving module configured to receive an internet protocol (IP) address of a first interface allocated by the Local Mobility Anchor after the second Mobile Access Gateway judges the access of the MN as a switching access, wherein the IP address of the first interface comprises: an IPv6 Home Network Prefix and/or an IPv4 Home address;
- wherein the Mobile Node is connected with the first Mobile Access Gateway through the first interface, and connected with the second Mobile Access Gateway through a second interface;
- wherein the connection request carries the IP address of the first interface;
- wherein the Local Mobility Anchor is configure to:
- receive a Proxy Binding Update message from the second Mobile Access Gateway, wherein the Proxy Binding Update message carries identifier information of the Mobile Node, an IP address of the first interface, and an IP address of the second Mobile Access Gateway;
- check whether the identifier information of the Mobile Node and the IP address of the first interface exist in a Binding Cache Entry stored therein; in the case that the identifier information of the Mobile Node and the IP address of the first interface are found, further judge whether a Proxy Care-of-Address in the Binding Cache Entry is the same as the Proxy Care-of-Address in the Proxy Binding Update message;
- if the judging result is that the Proxy Care-of-Address in the Binding Cache Entry is different from the Proxy Care-of-Address in the Proxy Binding Update message, judge that the connection of the Mobile Node is a switching connection, and if it is judged that the Mobile Node has an ability of address preservation, send a Proxy Binding Acknowledgement message, which carries the IP address of the first interface, to the second Mobile Access Gateway.

* * * * *